US011312192B1

(12) United States Patent
Wipf (10) Patent No.: US 11,312,192 B1
(45) Date of Patent: Apr. 26, 2022

(54) CONVERTIBLE TOW HITCH SYSTEM

(71) Applicant: Danny Wipf, Lake Andes, SD (US)

(72) Inventor: Danny Wipf, Lake Andes, SD (US)

( * ) Notice: Subject to any disclaimer, the term of this patent is extended or adjusted under 35 U.S.C. 154(b) by 811 days.

(21) Appl. No.: 16/211,379

(22) Filed: Dec. 6, 2018

(51) Int. Cl.
*B60D 1/07* (2006.01)
*B60D 1/02* (2006.01)
*B60D 1/06* (2006.01)

(52) U.S. Cl.
CPC ............... *B60D 1/07* (2013.01); *B60D 1/02* (2013.01); *B60D 1/06* (2013.01)

(58) Field of Classification Search
CPC ... B60D 1/07; B60D 1/02; B60D 1/06; B60D 1/075
See application file for complete search history.

(56) References Cited

U.S. PATENT DOCUMENTS

| | | | | |
|---|---|---|---|---|
| 2,355,695 A | * | 8/1944 | Atwood | B60D 1/065 56/DIG. 14 |
| 3,801,134 A | | 4/1974 | Dees | |
| 4,482,167 A | | 11/1984 | Haugrud | |
| 5,193,625 A | * | 3/1993 | Goll | B60D 1/07 172/248 |
| 6,217,054 B1 | * | 4/2001 | Klimek | B60D 1/28 280/511 |
| 6,312,004 B1 | | 11/2001 | Kiss | |
| 6,502,845 B1 | | 1/2003 | Van Vleet | |
| 6,945,550 B2 | | 9/2005 | Williams | |
| 7,784,813 B2 | * | 8/2010 | Columbia | B60D 1/07 280/495 |
| 8,276,932 B2 | | 10/2012 | Columbia | |
| 8,371,603 B2 | | 2/2013 | Columbia | |
| 10,406,871 B1 | * | 9/2019 | Cassidy | B60D 1/06 |
| 2004/0007852 A1 | | 1/2004 | Tambornino | |
| 2006/0214391 A1 | * | 9/2006 | Columbia | B60D 1/07 280/491.5 |
| 2007/0252360 A1 | | 11/2007 | Wooten | |
| 2008/0179861 A1 | | 7/2008 | Columbia | |
| 2010/0201100 A1 | * | 8/2010 | Hill | B60D 1/07 280/477 |

(Continued)

OTHER PUBLICATIONS

CTD Hitches, brochure, 14 pages. Canadian Tool & Die Ltd., Winnipeg, MB, Canada.

*Primary Examiner* — Minnah L Seoh
*Assistant Examiner* — Conan D Duda
(74) *Attorney, Agent, or Firm* — Jeffrey A. Proehl; Woods, Fuller, Shultz & Smith, PC (57) ABSTRACT

A convertible hitch apparatus may be removably mountable on a hitch receiver tube and include a mount tube assembly being at least partially insertable into the receiver tube for mounting on the hitch receiver tube, with the mount tube assembly defining a retraction channel and an upper hitch aperture. The apparatus may also include a lower mount support movably mounted on the retraction channel of the mount tube assembly to move between a retracted position and an extended position with respect to the mount tube assembly. The lower mount support may define a lower hitch aperture which may be below and in substantially vertical alignment with the upper hitch aperture when the lower mount support is in the retracted position. The lower hitch aperture may be moved out of vertical alignment with the upper hitch aperture when the lower mount support is in the retracted position.

19 Claims, 8 Drawing Sheets

(56) References Cited

U.S. PATENT DOCUMENTS

| | | | | |
|---|---|---|---|---|
| 2010/0207357 A1* | 8/2010 | Hathcock | ................ | B60D 1/60 |
| | | | | 280/416.1 |
| 2010/0207360 A1* | 8/2010 | Columbia | ................ | B60D 1/01 |
| | | | | 280/515 |
| 2014/0091554 A1* | 4/2014 | Columbia | ................ | B60D 1/07 |
| | | | | 280/504 |
| 2015/0137484 A1* | 5/2015 | Columbia | ................ | B60D 1/58 |
| | | | | 280/507 |
| 2015/0184795 A1* | 7/2015 | Babuska | ................ | B60D 1/46 |
| | | | | 248/314 |
| 2017/0087947 A1* | 3/2017 | Moore | .................... | B60D 1/28 |

* cited by examiner

CONVERTIBLE TOW HITCH SYSTEM

BACKGROUND

Field

The present disclosure relates to tow hitch systems and more particularly pertains to a new convertible tow hitch system for facilitating conversion of a hitch apparatus between configurations usable with different types of fishing systems.

SUMMARY

In one aspect, the present disclosure relates to a convertible hitch apparatus which may be removably mountable on a hitch receiver tube and include a mount tube assembly being at least partially insertable into the receiver tube for mounting on the hitch receiver tube, with the mount tube assembly defining a retraction channel and an upper hitch aperture. The apparatus may also include a lower mount support movably mounted on the retraction channel of the mount tube assembly to move between a retracted position and an extended position with respect to the mount tube assembly. The lower mount support may define a lower hitch aperture which may be below and in substantially vertical alignment with the upper hitch aperture when the lower mount support is in the retracted position. The lower hitch aperture may be moved out of vertical alignment with the upper hitch aperture when the lower mount support is in the retracted position.

In another aspect, the present disclosure relates to a hitch system between a towing vehicle and a trailing vehicle. The hitch system may include a hitch receiver tube mounted on the towing vehicle and the receiver tube defining a tube interior, and a convertible hitch apparatus removably mountable on the hitch receiver tube. The apparatus may comprise a mount tube assembly being at least partially inserted into the receiver tube for mounting on the hitch receiver tube, with the mount tube assembly defining a retraction channel and an upper hitch aperture. The hitch apparatus may also include a lower mount support movably mounted on the retraction channel of the mount tube assembly to move between a retracted position and an extended position with respect to the mount tube assembly. The lower mount support may define a lower hitch aperture being below and in substantially vertical alignment with the upper hitch aperture when the lower mount support is in the retracted position, and the lower hitch aperture may be moved out of vertical alignment with the upper hitch aperture when the lower mount support is in the retracted position.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
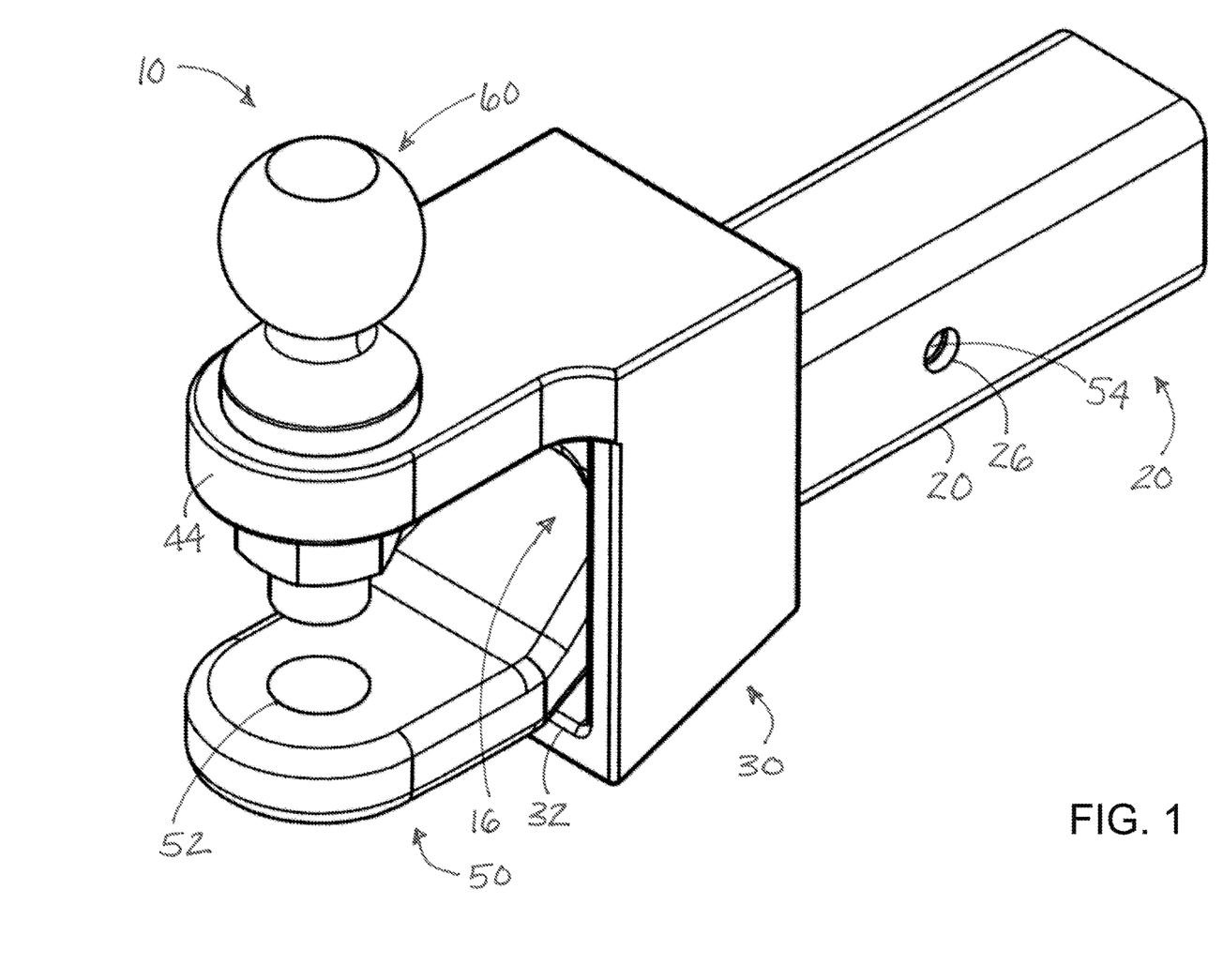
FIG. 1 is a schematic perspective view of a new convertible tow hitch apparatus for use in a hitch system, the hitch apparatus being shown with a ball hitch and a lower mount support in a retracted position, according to the present disclosure.
Figure 2:
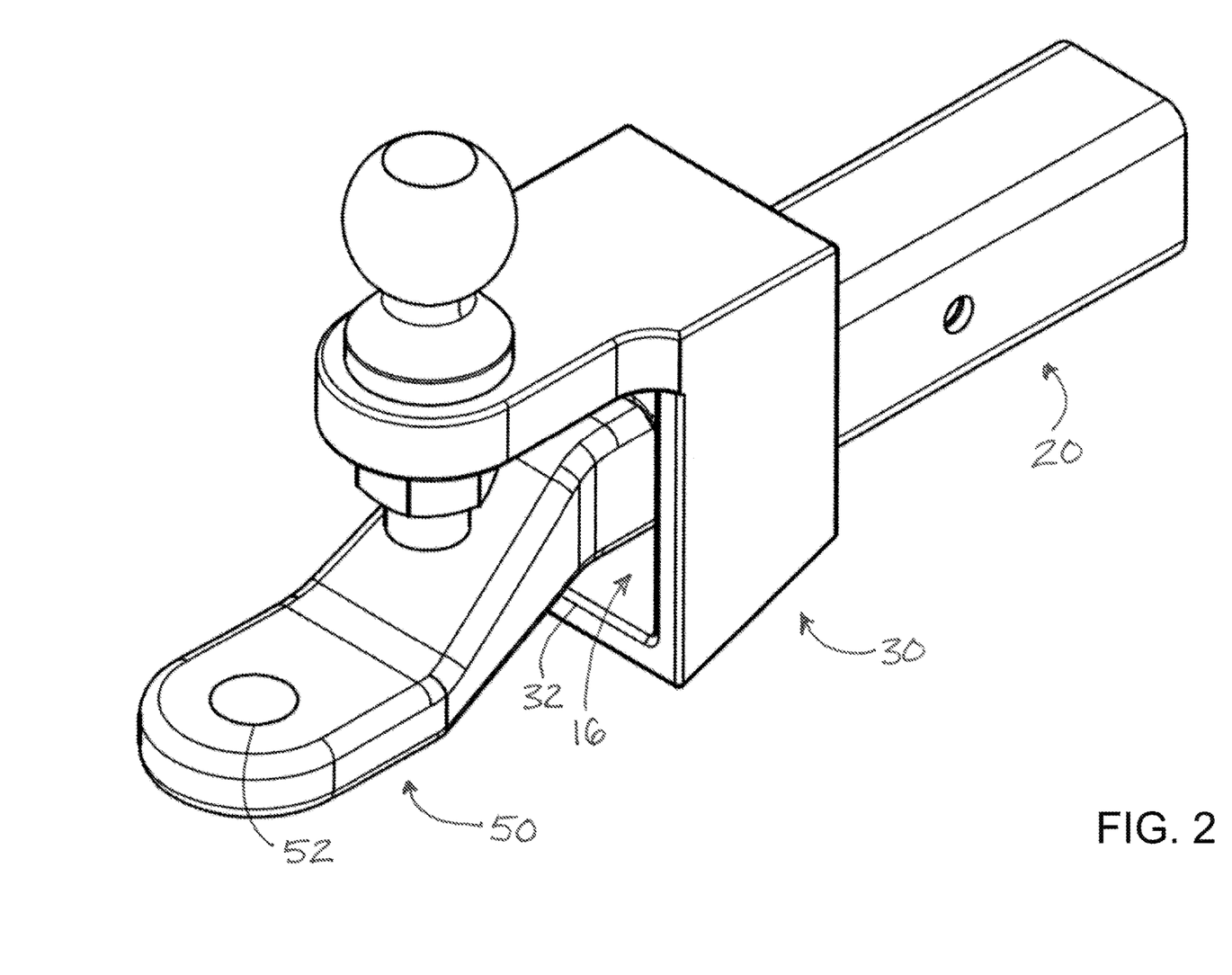
FIG. 2 is a schematic perspective view of the hitch apparatus with the lower mount support shown in an extended condition, according to an illustrative embodiment.
Figure 3:
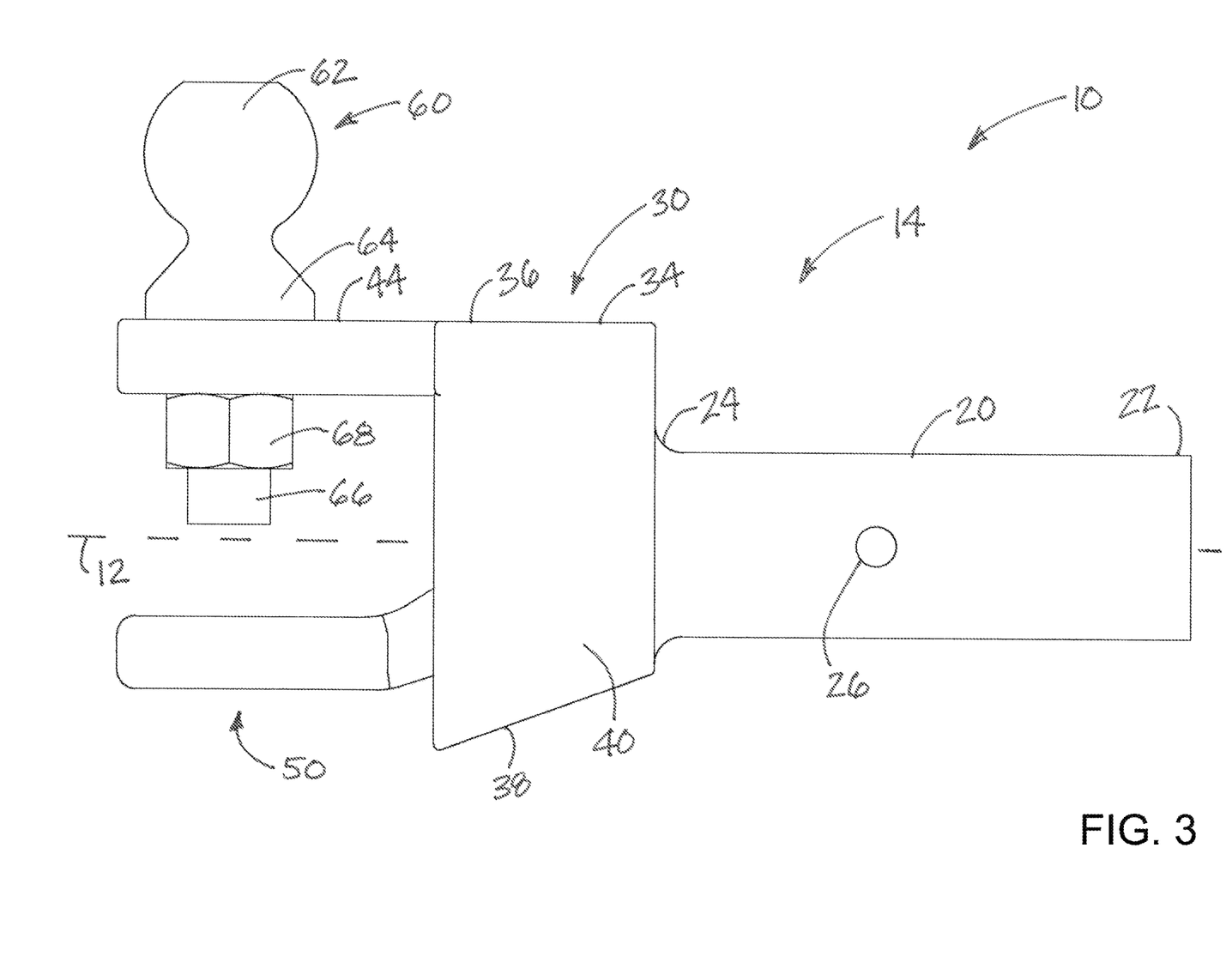
FIG. 3 is a schematic side view of the hitch apparatus in the retracted condition, according to an illustrative embodiment.
Figure 4:
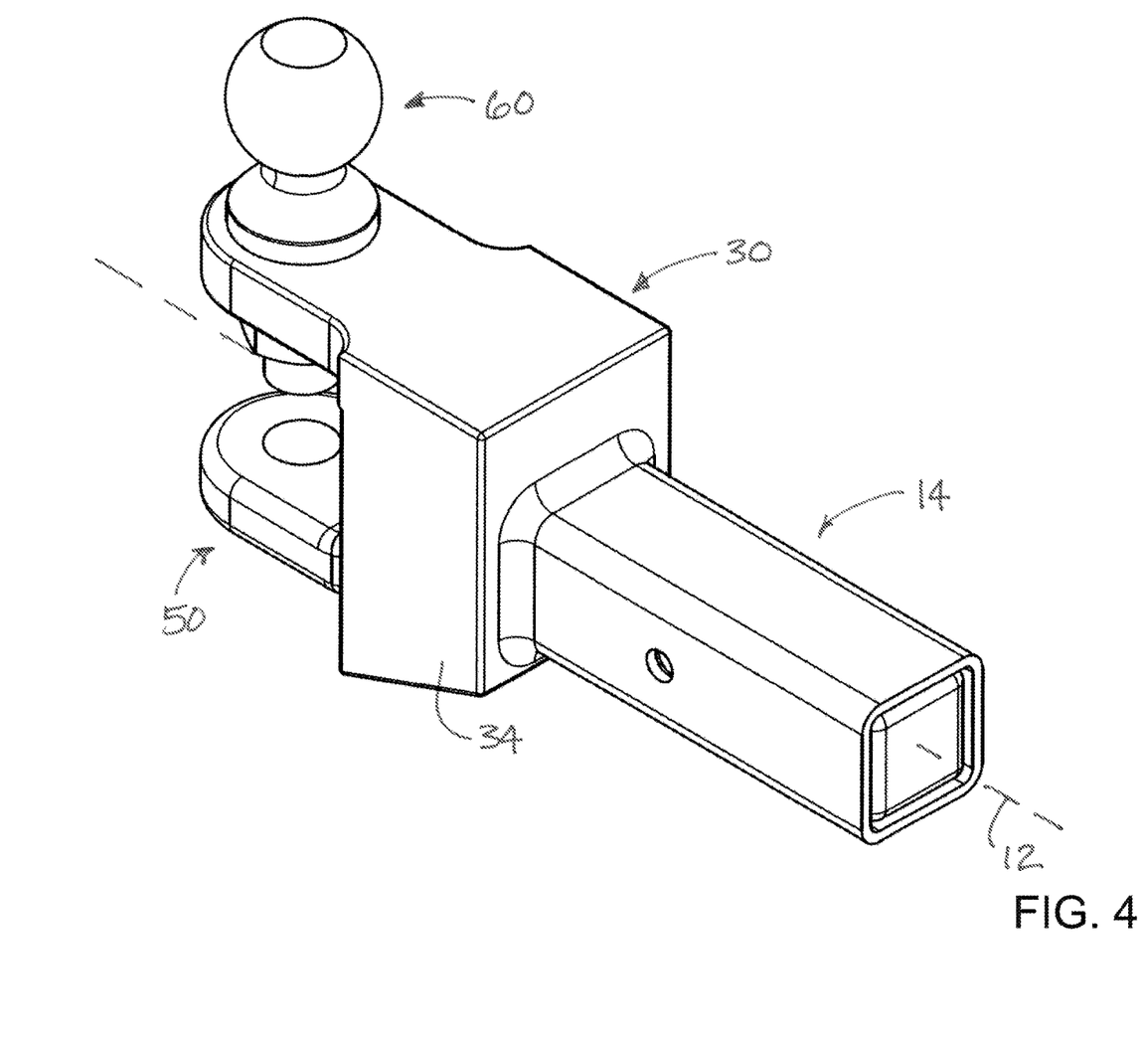
FIG. 4 is a schematic perspective view of the hitch apparatus, according to an illustrative embodiment.
Figure 5:
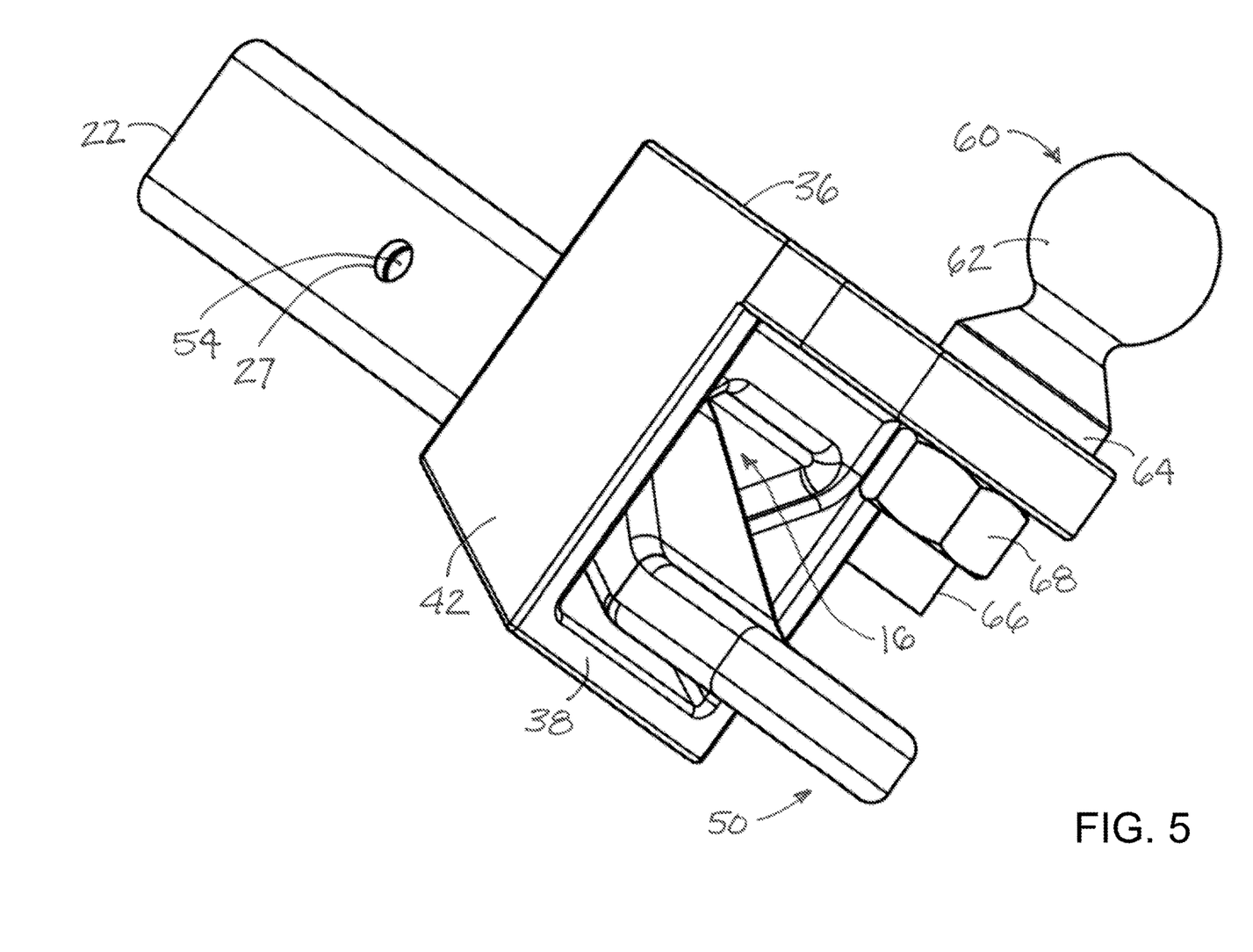
FIG. 5 is a schematic perspective view of the hitch apparatus, according to an illustrative embodiment.
Figure 6:
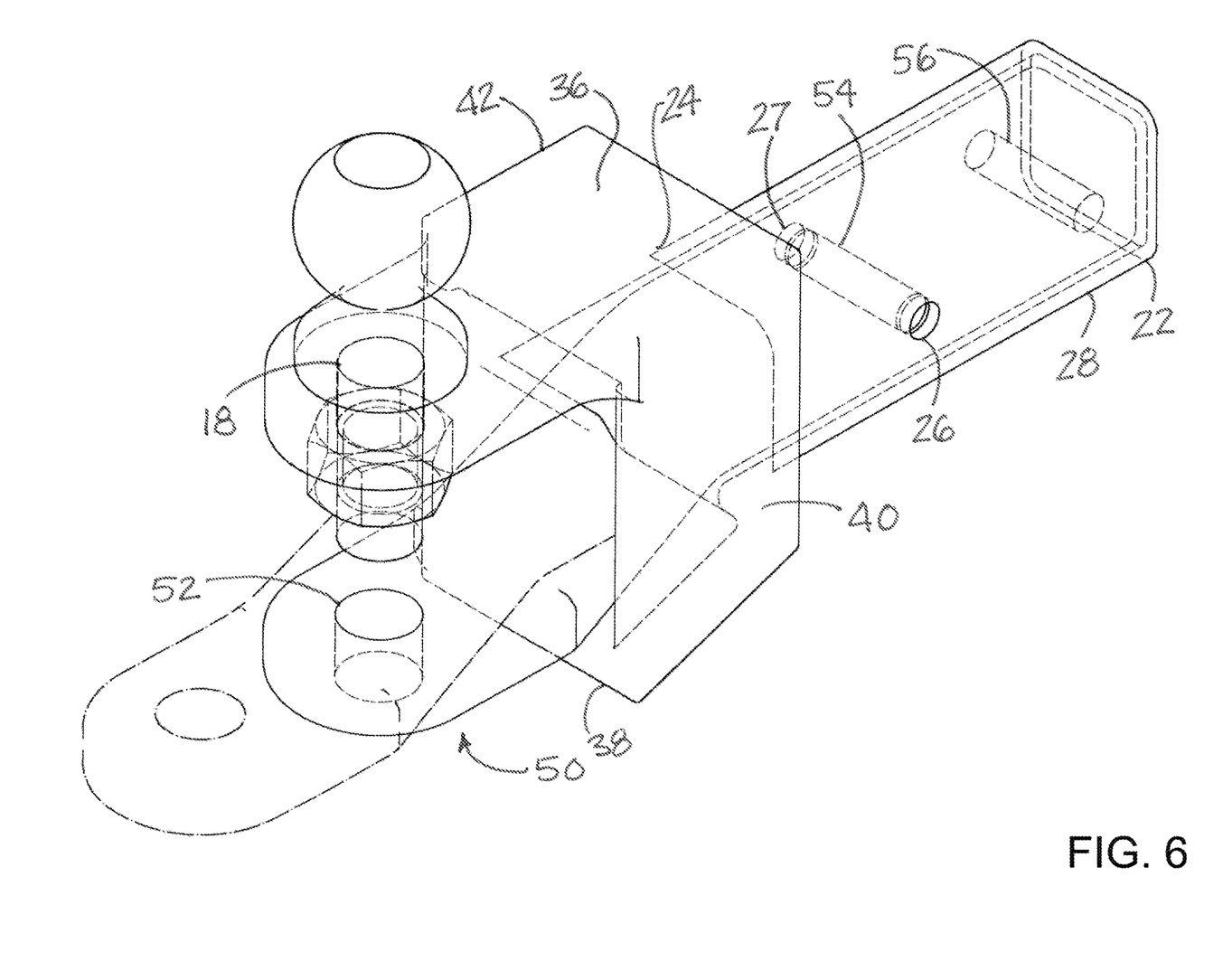
FIG. 6 is a schematic perspective view of the hitch apparatus shown with phantom lines to reveal internal features of the apparatus and the lower mount support in a retracted and extended position, according to an illustrative embodiment.
Figure 7:
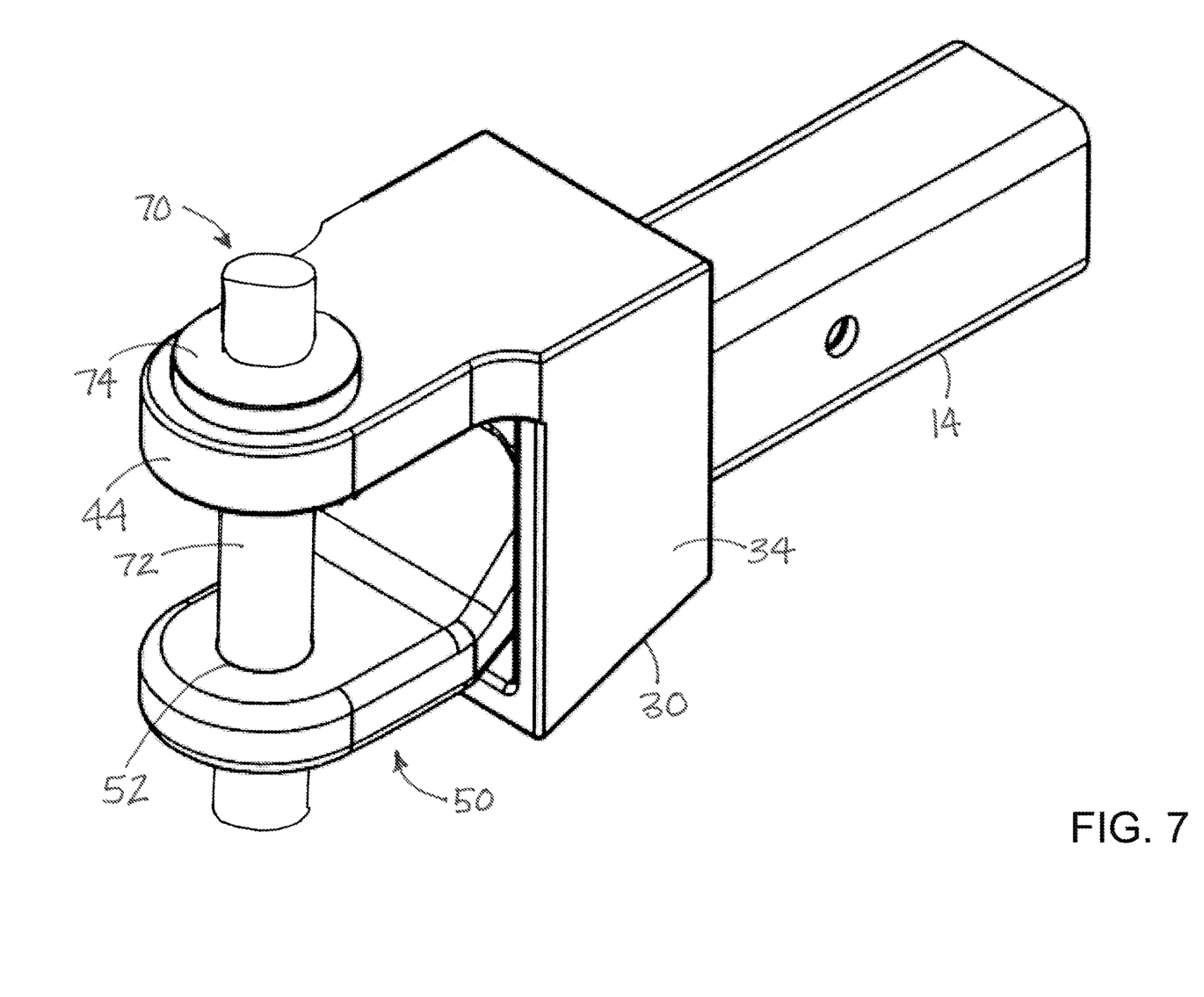
FIG. 7 is a schematic perspective view of the hitch apparatus shown with a hitch pin for a clevis hitch, according to the present disclosure.
Figure 8:
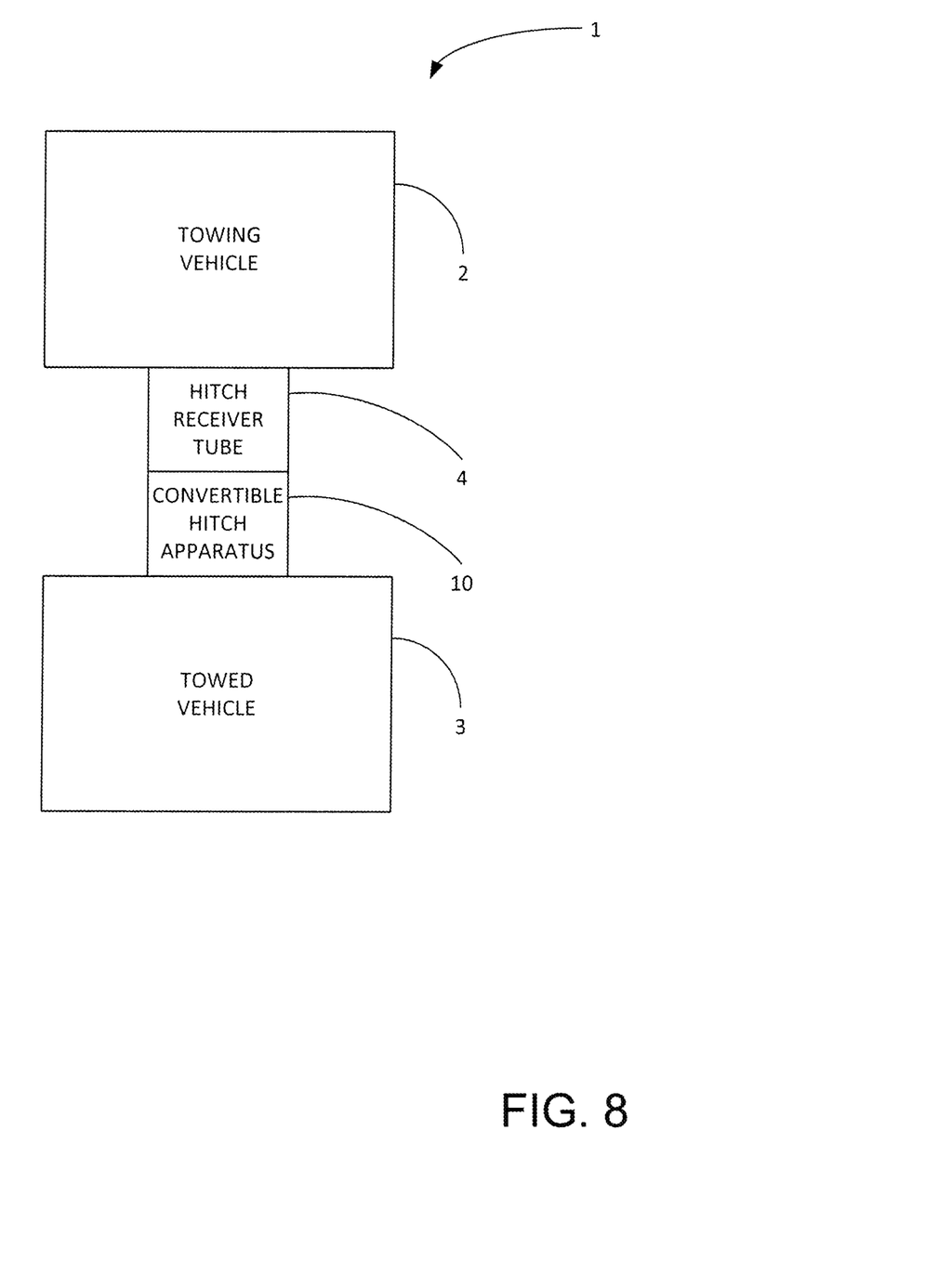
FIG. 8 is a schematic diagram of a hitch system utilizing the convertible hitch apparatus, according to the present disclosure.

With reference now to the drawings, and in particular to FIGS. 1 through 8 thereof, a new convertible tow hitch system embodying the principles and concepts of the disclosed subject matter will be described.

Vehicles often tow or pull other vehicles, or trailers, behind them using a large variety of different hitching structures. The applicant has recognized that utilizing more than one of the different towing elements on a towing vehicle to match the variety of towing elements that may be present on different trailers has the disadvantage of requiring the user to absorb the expense of obtaining various towing elements, experience the hassle of maintaining storing the towing elements in a convenient location when not being utilized, and endure the laborious this of interchanging the towing elements when a trailer with different type of towing element is to be pulled.

As an example of some of the different towing structures utilized, many towing structures include a ball mount on the towing vehicle and a ball receiver on the towed trailer. In other towing structures, such as a clevis hitch, the towing element of the towing vehicle is a single flat tongue and the towing elements on the towed trailer are a pair of vertically spaced tongues to be positioned above and below the single tongue on the towing vehicle. In still another variation of clevis hitches, the pair of vertically spaced tongues may comprise the towing elements on the towing vehicle, and the single tongue on the towed trailer may be positioned between the vertically spaced tongues.

The applicant has thus devised a convertible hitch apparatus 10 which may be utilized as an element of a hitch system 1 between a towing vehicle 2 and a trailing vehicle 3, or trailer. The convertible hitch apparatus 10 may be utilized with a variety of hitch types, including (but not necessarily limited to) the ball hitch type and the clevis hitch type, and may support a ball mount while also functioning as the single tongue element for the double tongue element of a clevis hitch. The hitch apparatus 10 is able to mount and support a ball mount of the ball hitch as well as a hitch pin of a clevis hitch.

The convertible hitch apparatus 10 is highly suitable for use with a conventional hitch receiver type structure mounted on the towing vehicle which includes a hitch receiver tube 4 which defines a tube interior for receiving a portion of the hitch apparatus 10. The hitch apparatus 10 may be removably mountable on the hitch receiver tube 4 to effectively mount the hitch apparatus onto the towing vehicle.

The hitch apparatus 10 is generally elongated along a longitudinal axis 12 which is generally aligned with the longitudinal axis of the towing vehicle as well as (in most cases) the longitudinal axis of the towed trailer. The hitch apparatus 10 may include a mount tube assembly 14 for mounting on the hitch receiver tube 4 and a lower mount support 50 described below. In greater detail, the mount tube assembly 14 may be at least partially insertable into the interior of the receiver tube 4 to mount the assembly 14, and the hitch apparatus 10, on the towing vehicle. The mount tube assembly may define a retraction channel 16 for receiving at least a portion of the lower mount support 50. The mount tube assembly may also define an upper hitch aperture 18.

The mount tube assembly 14 may further include a mount portion 20 which may be partially insertable into the tube interior of the receiver tube 4, and may have an insertion end 22 which is insertable into the tube interior. In some embodiments, the insertion end 22 of the tube of the mount portion may be closed to reduce the opportunity for debris to enter into the retraction channel 16 defined by the mount portion. The mount portion 20 may also have a mount end 24 located opposite of the insertion end 22. A pair of securing holes 26, 27 may be formed on the mount portion, and may be located in opposition to each other on opposite sides of the retraction channel 16 for alignment with the holes (not shown) conventionally found in similar positions on the hitch receiver tube. The tubular mount portion may be formed by a mount portion wall 28 extending between the insertion 22 and mount 24 ends of the mount portion. In some embodiments, the mount portion wall 28 has a generally square cross-section measuring between approximately 1 inch and approximately 3 inches on a side. In some of the most suitable embodiments, the mount portion wall may measure approximately 2 inches or approximately 2½ inches on a side, with embodiments measuring approximately 2½ inches on a side being highly suitable for use.

The mount tube assembly 14 may also include a collar portion 30 which is mounted on the mount portion 20. The collar portion 30 may be located at the mount end 24 of the mount portion and may define an opening 32 which is in communication with the retraction channel 16. In some embodiments, a transverse cross-section of the opening 32 of the collar portion may be larger in area than a transverse cross-section of the retraction channel 16 of the mount portion. The collar portion 30 may include a perimeter wall 34 which may include an upper wall section 36, a lower wall section 38, and a pair of side wall sections 40, 42 extending between the upper 36 and lower 38 wall sections in a substantially rectangular configuration.

An upper extension portion 44 may extend from the collar portion 30 in the longitudinal direction of the hitch apparatus, and may extend in a direction that is opposite of the mount portion 20. The upper extension portion may extend from the upper wall section 36 of the collar portion and may define the upper hitch aperture 18.

The lower mount support 50 of the hitch apparatus 10 may be mounted on the mount tube assembly 14 in a manner that permits the support 50 to move with respect to the tube assembly. The mount support 50 may be movable between a retracted position (see, e.g., FIG. 1) and an extended position (see, e.g., FIG. 2). The lower mount support 50 may define a lower hitch aperture 52 which may be vertically alignable with the upper hitch aperture 18 when the mount support 50 is in the retracted position, and is out of vertical alignment with the upper hitch aperture when the support 50 is in the extended position. When the lower mount support 50 is in the retracted position, the upper extension portion 44 of the mount tube assembly and the lower mount support 50 may form the vertically spaced tongues of a clevis hitch. When the lower mount support is in the extended position, the mount support 50 may form the single tongue of a clevis hitch.

To secure the lower mount support 50 in either the extended position or the retracted position, the lower mount support may be provided with a first passage 54 which is alignable with the pair of securing holes 26, 27 in the mount portion 20 when the lower mount support is in the retracted position. The lower mount support 50 may also be provided with the second passage 56 which is alignable with the pair of securing holes in the mount portion when the lower mount support is in the extended position. The first and second passages may be separated from each other in the longitudinal direction of the apparatus. A mount pin 58 may releasably secure the lower mount support on the mount tube assembly when passed through the pair of securing holes 26, 27 of the mount portion and either one of the first 54 or second 56 passages in the lower mount support. Further, the mount pin 58 may also extend through the holes in the hitch receiver tube 4 to secure the hitch apparatus 10 to the hitch receiver tube 4.

Optionally, the hitch system 1 may also include a ball hitch 60 which is removably mounted on the mount tube assembly 14 such as by extending a portion of the ball hitch 60 through the upper hitch aperture 18 to thereby mount the ball hitch on the upper extension portion 44 of the collar portion. In some embodiments, the ball hitch 60 may include a ball portion 62, a flange portion 64 located below the ball portion 62, and a post portion 66 removably positionable in the hitch aperture. The post portion 66 may have threads formed thereon and a securing nut 68 may be removably mounted on the threaded shaft of the post portion to secure the flange portion 64 against the upper extension portion and thereby on the hitch apparatus.

The hitch system 1 may also optionally include a hitch pin assembly 70 which may be removably mounted on the mount tube assembly and/or the lower mount support, and extend through the upper hitch aperture and/or the lower hitch aperture, depending upon whether the lower mount support is in the retracted position or the extended position. As such, the hitch apparatus 10 may act as a double tongue clevis hitch element or a single tongue clevis hitch element. Illustratively, the hitch pin assembly may include a hitch shaft 72 which may be removably received in one or more of the hitch apertures, a hitch flange 74 on the shaft for blocking passage of the hitch shaft completely through the upper and/or lower hitch apertures, and a hinge clip (not shown) removably mounted on the hitch shaft 72 to secure the hitch shaft on the hitch apparatus.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A convertible hitch apparatus removably mountable on a hitch receiver tube, the apparatus comprising:
    a mount tube assembly being at least partially insertable into the receiver tube for mounting on the hitch receiver tube, the mount tube assembly defining a retraction channel and an upper hitch aperture; and
    a lower mount support slidingly mounted in the retraction channel of the mount tube assembly to move horizontally between a retracted position and an extended position with respect to the mount tube assembly, the lower mount support defining a lower hitch aperture, the lower hitch aperture being below and in vertical alignment with the upper hitch aperture when the lower mount support is in the retracted position, the lower hitch aperture being moved out of vertical alignment with the upper hitch aperture when the lower mount support is in the extended position.

2. The apparatus of claim 1 wherein the hitch apparatus being convertible between a ball hitch and a clevis hitch.

3. The apparatus of claim 1 wherein the mount tube assembly comprises:
    a mount portion partially insertable into the hitch receiver tube and defining the retraction channel;
    a collar portion mounted on the mount portion; and
    an upper extension portion extending from the collar portion in a direction opposite of the mount portion, the upper extension portion defining the upper hitch aperture.

4. The apparatus of claim 3 wherein a pair of securing holes is formed on the mount portion, the securing holes being located in opposition to each other on opposite sides of the retraction channel for alignment with holes on the hitch receiver tube to secure the mount portion of the hitch apparatus to the hitch receiver tube.

5. The apparatus of claim 4 wherein the lower mount support has a first passage alignable with the pair of securing holes in the mount portion when the lower mount support is in the retracted position and a second passage alignable with the pair of securing holes in the mount portion when the lower mount support is in the extended position.

6. The apparatus of claim 5 additionally comprising a mount pin to releasably secure the lower mount support on the mount tube assembly, the mount pin being removably mountable in the pair of securing holes of the mount portion of the mount tube assembly and an aligned one of the first passage and the second passage.

7. The apparatus of claim 1 additionally comprising a ball hitch removably mounted on the mount tube assembly.

8. The apparatus of claim 7 additionally comprising a hitch pin assembly removably insertable through the upper hitch aperture of the mount tube assembly and the lower hitch aperture of the lower mount support when the lower mount support is in the retracted position.

9. The apparatus of claim 1 additionally comprising a hitch pin assembly removably insertable through the upper hitch aperture of the mount tube assembly and the lower hitch aperture of the lower mount support when the lower mount support is in the retracted position.

10. The apparatus of claim 1 wherein the mount tube assembly includes a mount portion defining the retraction channel and a collar portion located at an end of the mount portion, the collar portion defining an opening in communication with the retraction channel, the collar portion including a perimeter wall with an upper wall section, a lower wall section, and a pair of side wall sections extending between the upper and lower wall sections.

11. A hitch system between a towing vehicle and a trailing vehicle, the hitch system comprising:
    a hitch receiver tube mounted on the towing vehicle and the receiver tube defining a tube interior;
    a convertible hitch apparatus removably mountable on the hitch receiver tube, the apparatus comprising:
        a mount tube assembly being at least partially inserted into the receiver tube for mounting on the hitch receiver tube, the mount tube assembly defining a retraction channel and an upper hitch aperture; and
        a lower mount support slidingly mounted in the retraction channel of the mount tube assembly to move horizontally between a retracted position and an extended position with respect to the mount tube assembly, the lower mount support defining a lower hitch aperture, the lower hitch aperture being below and in vertical alignment with the upper hitch aperture when the lower mount support is in the retracted position, the lower hitch aperture being moved out of vertical alignment with the upper hitch aperture when the lower mount support is in the extended position.

12. The system of claim 11 wherein the hitch apparatus is convertible between a ball hitch and a clevis hitch.

13. The system of claim 11 wherein the mount tube assembly comprises:
   a mount portion partially inserted into the hitch receiver tube and defining the retraction channel;
   a collar portion mounted on the mount portion; and
   an upper extension portion extending from the collar portion in a direction opposite of the mount portion, the upper extension portion defining the upper hitch aperture.

14. The system of claim 13 wherein a pair of securing holes is formed on the mount portion, the securing holes being located in opposition to each other on opposite sides of the retraction channel for alignment with holes on the hitch receiver tube to secure the mount portion of the hitch apparatus to the hitch receiver tube.

15. The system of claim 14 wherein the lower mount support has a first passage alignable with the pair of securing holes in the mount portion when the lower mount support is in the retracted position and a second passage alignable with the pair of securing holes in the mount portion when the lower mount support is in the extended position.

16. The system of claim 15 additionally comprising a mount pin to releasably secure the lower mount support on the mount tube assembly, the mount pin being removably mountable in the pair of securing holes of the mount portion of the mount tube assembly and an aligned one of the first passage and the second passage.

17. The system of claim 11 additionally comprising a ball hitch removably mounted on the mount tube assembly.

18. The system of claim 17 additionally comprising a hitch pin assembly removably insertable through the upper hitch aperture of the mount tube assembly and the lower hitch aperture of the lower mount support when the lower mount support is in the retracted position.

19. The system of claim 11 additionally comprising a hitch pin assembly removably insertable through the upper hitch aperture of the mount tube assembly and the lower hitch aperture of the lower mount support when the lower mount support is in the retracted position.

* * * * *